United States Patent
Beverly

(10) Patent No.: US 10,257,890 B2
(45) Date of Patent: Apr. 9, 2019

(54) INDUCTION COOKWARE

(71) Applicant: BOSE CORPORATION, Framingham, MA (US)

(72) Inventor: David W. Beverly, Lunenburg, MA (US)

(73) Assignee: BOSE CORPORATION, Framingham, MA (US)

( * ) Notice: Subject to any disclaimer, the term of this patent is extended or adjusted under 35 U.S.C. 154(b) by 849 days.

(21) Appl. No.: 14/614,955

(22) Filed: Feb. 5, 2015

(65) Prior Publication Data

US 2016/0234888 A1  Aug. 11, 2016

(51) Int. Cl.
| | |
|---|---|
| *H05B 6/12* | (2006.01) |
| *A47J 36/02* | (2006.01) |
| *A47J 27/00* | (2006.01) |
| *C22C 21/00* | (2006.01) |
| *C22C 21/08* | (2006.01) |
| *C22C 38/00* | (2006.01) |
| *C22C 38/02* | (2006.01) |
| *C22C 38/04* | (2006.01) |
| *C22C 38/18* | (2006.01) |
| *C22C 38/44* | (2006.01) |
| *C22C 38/58* | (2006.01) |

(52) U.S. Cl.
CPC .............. *H05B 6/12* (2013.01); *A47J 27/002* (2013.01); *A47J 36/02* (2013.01); *C22C 21/00* (2013.01); *C22C 21/08* (2013.01); *C22C 38/002* (2013.01); *C22C 38/02* (2013.01); *C22C 38/04* (2013.01); *C22C 38/18* (2013.01); *C22C 38/44* (2013.01); *C22C 38/58* (2013.01)

(58) Field of Classification Search
CPC ......... A47J 27/002; A47J 36/02; C22C 21/00; C22C 21/08; C22C 38/002; C22C 38/02; C22C 38/04; C22C 38/18; C22C 38/44; C22C 38/58; H05B 6/12; H05B 6/065; B23K 20/02; B23K 20/04; B23K 2103/02–2103/06; B23K 20/10; B23K 20/20

USPC .............. 99/DIG. 14, 451; 228/235.1–235.3, 228/262.4, 262.5
See application file for complete search history.

(56) References Cited

U.S. PATENT DOCUMENTS

| | | | | |
|---|---|---|---|---|
| 1,499,118 | A | * | 6/1924 | Morgan .................. A47J 36/02 126/375.1 |
| 2,321,587 | A | * | 6/1943 | Preston .................. C03C 17/06 174/395 |
| 3,530,499 | A | * | 9/1970 | Schroeder .............. H05B 3/685 219/621 |

(Continued)

FOREIGN PATENT DOCUMENTS

| | | | |
|---|---|---|---|
| FR | 2405680 | * | 5/1979 |
| WO | WO2008092323 | * | 8/2008 |
| WO | WO2016071858 | * | 11/2014 |

OTHER PUBLICATIONS

International Search Report and Written Opinion from corresponding International Application No. PCT/US2016/016523 dated May 23, 2016.

*Primary Examiner* — Ibrahime A Abraham
*Assistant Examiner* — Frederick Calvetti
(74) *Attorney, Agent, or Firm* — Lando & Anastasi, LLP

(57) ABSTRACT

An inductive cooking utensil with a concave cooking surface at room temperature and a substantially flat cooking surface at a cooking temperature.

28 Claims, 9 Drawing Sheets

(56) References Cited

U.S. PATENT DOCUMENTS

| | | | | |
|---|---|---|---|---|
| 3,584,196 A * | 6/1971 | Kurokawa | H01C 7/022 | 219/432 |
| 3,592,634 A * | 7/1971 | Denhard, Jr. | C22C 38/58 | 420/47 |
| 3,979,572 A * | 9/1976 | Ito | A47J 36/02 | 219/621 |
| 4,544,818 A * | 10/1985 | Minamida | H05B 6/12 | 219/621 |
| 4,564,001 A * | 1/1986 | Maeda | A47J 27/002 | 126/390.1 |
| 5,532,461 A * | 7/1996 | Crummenauer | A47J 27/002 | 126/390.1 |
| 5,564,589 A * | 10/1996 | Fu | A47J 27/002 | 220/573.1 |
| 5,564,590 A * | 10/1996 | Kim | A47J 36/02 | 126/390.1 |
| 5,643,485 A * | 7/1997 | Potter | A47J 27/002 | 126/375.1 |
| 5,693,244 A * | 12/1997 | Pragt | A47J 27/21066 | 219/429 |
| 5,952,112 A * | 9/1999 | Spring | A47J 36/02 | 220/573.1 |
| 6,222,989 B1 * | 4/2001 | Lee | A01M 1/2077 | 219/538 |
| 6,463,779 B1 * | 10/2002 | Terziakin | B21D 37/16 | 148/567 |
| 6,640,605 B2 * | 11/2003 | Gitlin | B21D 5/00 | 72/379.2 |
| 7,761,971 B2 * | 7/2010 | Cheng | A47J 27/002 | 29/505 |
| 8,381,640 B1 * | 2/2013 | Wilson | A47J 37/10 | 210/464 |
| 2006/0196877 A1 * | 9/2006 | Droese | A47J 27/002 | 220/573.3 |
| 2009/0065496 A1 * | 3/2009 | England | A47J 36/02 | 219/621 |
| 2009/0065500 A1 * | 3/2009 | England | A47J 27/002 | 219/621 |
| 2009/0321453 A1 * | 12/2009 | Bourdin | A47J 27/002 | 220/573.1 |
| 2010/0140276 A1 * | 6/2010 | Cuillery | A47J 36/02 | 220/573.2 |
| 2010/0154654 A1 * | 6/2010 | Northcut | A47J 37/067 | 99/422 |
| 2010/0255340 A1 * | 10/2010 | Ge | A47J 36/02 | 428/655 |
| 2012/0132642 A1 * | 5/2012 | Broders | G05D 23/1902 | 219/488 |
| 2012/0132646 A1 * | 5/2012 | England | H05B 6/062 | 219/622 |
| 2012/0223086 A1 * | 9/2012 | Mathieu | A47J 27/002 | 220/573.1 |
| 2014/0225709 A1 * | 8/2014 | Kirch | H01H 37/72 | 337/365 |
| 2015/0153049 A1 * | 6/2015 | Jacob | F24C 7/087 | 219/485 |
| 2015/0364284 A1 * | 12/2015 | Mitschele | H01H 1/58 | 337/111 |

* cited by examiner

INDUCTION COOKWARE

TECHNICAL FIELD

Aspects and implementations of the present disclosure are directed generally to cookware, and in some examples, more specifically to cookware for use with induction cooktops.

BACKGROUND

Some conventional cooktops deliver heat to a cooking utensil (e.g., a pan, pot, skillet, etc.) by, for example, a gas flame or electric resistance coil. In these cooktops, any material that lies between the heat source and the cooking utensil (e.g., a glass cooktop) is also heated. Induction cooktops work differently. In an induction cooktop, an alternating current in an induction coil produces a time dependent magnetic field that induces eddy currents in electrically conductive materials near the coil, such as a ferromagnetic component (or the target material) of induction cooking utensils. As eddy currents flow within the target material, it becomes hot via a joule heating mechanism. Heat in the target is conducted through the body of the cooking utensil to the food surface, and the food is cooked. Heating of the body of the cooking utensil will generally cause a change in shape of the body of the cooking utensil. A cooking surface of the cooking utensil may become more concave or more convex as compared to its shape at room temperature as the body of the cooking utensil is heated. The change in shape of the cooking utensil as it is heated may depend on the dimensions and compositions of one or more layers of materials of the body of the cooking utensil.

SUMMARY

In accordance with an aspect of the present disclosure, there is provided an inner wall for an inductive cooking utensil having a non-flat cooking surface at room temperature and a substantially flat cooking surface at a cooking temperature. The inner wall is formed from a multi-layered structure including an upper cooking layer that is substantially corrosion resistant to food materials at high temperatures and a heat spreader layer having an upper surface coupled to a lower surface of the upper cooking layer. The heat spreader layer is formed from a material having a substantially higher coefficient of thermal conductivity than the upper cooking layer. The inner wall further includes a target layer having an upper surface bonded to a lower surface of the heat spreader layer. The target layer is formed of a material having a greater magnetic susceptibility or magnetizability than each of the heat spreader layer and the upper cooking layer and a coefficient of thermal conductivity lower than the coefficient of thermal conductivity of the heat spreader layer.

In accordance with another aspect of the present disclosure, there is provided an inductive cooking utensil including a target layer, a heat spreader layer bonded to the target layer, and a cooking layer bonded to the heat spreader layer. The cooking layer has a concave cooking surface at room temperature and a substantially flat cooking surface at a cooking temperature.

In some examples, the cooking surface is non-convex at the cooking temperature. The cooking temperature may be between about 218° C. and about 274° C., for example, about 227° C.

In some examples, the target layer consists essentially of a ferromagnetic material. The target layer may consist essentially of stainless steel. The target layer may consist essentially of 410 stainless steel. The target layer may consist essentially of 28 gauge 410 stainless steel. The target layer may consist essentially of 24 gauge 410 stainless steel.

In some examples, the heat spreader layer consists essentially of an aluminum alloy. The heat spreader layer may consist essentially of one of 1060 aluminum and 6061 aluminum. The heat spreader layer may consist essentially of a 2 mm thick layer of one of 1060 aluminum and 6061 aluminum.

In some examples, the cooking layer consists essentially of stainless steel. The cooking layer may consist essentially of one of 316 stainless steel and 305 stainless steel. The cooking layer may consist essentially of one of 24 gauge 316 stainless steel and 24 gauge 305 stainless steel.

In some examples, at room temperature, the cooking layer is concave with a center portion of the cooking layer being displaced about 0.5 mm below edges of the cooking layer.

In some examples, the cooking layer has a diameter of about 21 cm.

In some examples, the cooking layer, the heat spreader layer, and the target layer define a lower portion of an inner wall of the inductive cooking utensil, and the inductive cooking utensil further comprises a non-conductive outer wall and a gap defined between the lower portion of the inner wall and the outer wall.

In some examples, an inductive cooking utensil includes an inner wall including a target layer consisting essentially of 24 gauge 410 stainless steel or 28 gauge 410 stainless steel. The target layer is bonded to a lower surface of a heat spreader layer consisting essentially of a 2 mm thick layer of one of 1060 aluminum and 6061 aluminum which is bonded to a lower surface of a cooking layer consisting essentially of one of 24 gauge 316 stainless steel and 24 gauge 305 stainless steel. The inner wall is disposed within a non-conductive outer wall. A gap is defined between the inner wall and the outer wall.

In accordance with another aspect of the present disclosure, there is provided an inductive cooking utensil. The inductive cooking utensil comprises an outer wall and an inner wall disposed within and coupled to the outer wall. The inner wall has a concave cooking surface at room temperature and a substantially flat cooking surface at a cooking temperature of between about 218° C. and about 274° C., for example, about 227° C. A gap is defined between a portion of the inner wall and the outer wall. In some examples, the cooking surface is non-convex at the cooking temperature.

In some examples the inner wall includes a target layer, a heat spreader layer bonded to the target layer, and a cooking layer bonded to the heat spreader layer. The target layer may consist essentially of 28 gauge 410 stainless steel. The target layer may consist essentially of 24 gauge 410 stainless steel. The heat spreader layer may consist essentially of a 2 mm thick layer of one of 1060 aluminum and 6061 aluminum. The cooking layer may consist essentially of one of 24 gauge 316 stainless steel and 24 gauge 305 stainless steel. At room temperature, the inner wall may be concave with a center portion of the inner wall being displaced about 0.5 mm below edges of the inner wall.

In accordance with another aspect of the present disclosure, there is provided a method of forming an inner wall for an inductive cooking utensil. The method comprises bonding a cooking layer consisting essentially of one of 24 gauge 316 stainless steel and 24 gauge 305 stainless steel to an upper surface of a heat spreader layer consisting essentially of a 2 mm thick layer of one of 1060 aluminum and 6061 aluminum, and bonding a target layer consisting essentially of one of 24 gauge 410 stainless steel and 28 gauge 410 stainless steel to a lower surface of the heat spreader layer. Bonding the cooking layer to the heat spreader layer may include impact bonding the cooking layer to the heat spreader layer. Bonding the target layer to the heat spreader layer may include impact bonding the target layer to the heat spreader layer. Forming the inner wall may include forming the inner wall with a center portion of the inner wall being displaced about 0.5 mm below edges of the inner wall at room temperature.

In accordance with another aspect of the present disclosure, there is provided an inductive cooking utensil. The inductive cooking utensil comprises an outer wall and an inner wall disposed within and coupled to the outer wall. The inner wall includes means for absorbing electromagnetic energy from an inductive cooktop to heat the inner wall. The inner wall includes means to distribute heat across the inner wall to reduce the potential for hotspots in the inner wall upon heating. The inner wall includes means for altering the shape of a cooking surface of the inner wall as the inner wall is heated. The means for altering the shape of a cooking surface may cause the cooking surface to become more convex or more concave with increasing temperature. The cooking surface may be concave at room temperature and the means for altering the shape of a cooking surface may cause the cooking surface to become substantially flat at a desired cooking temperature, for example, between about 218° C. and about 274° C. or about 227° C. In some examples, the cooking surface becomes substantially flat, but not convex, at the desired cooking temperature.

In accordance with another aspect of the present disclosure, there is provided a method of forming an inner wall for an inductive cooking utensil. The method comprises means for bonding a cooking layer consisting essentially of one of 24 gauge 316 stainless steel and 24 gauge 305 stainless steel to an upper surface of a heat spreader layer consisting essentially of a 2 mm thick layer of one of 1060 aluminum and 6061 aluminum, and means for bonding a target layer consisting essentially of one of 24 gauge 410 stainless steel and 28 gauge 410 stainless steel to a lower surface of the heat spreader layer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
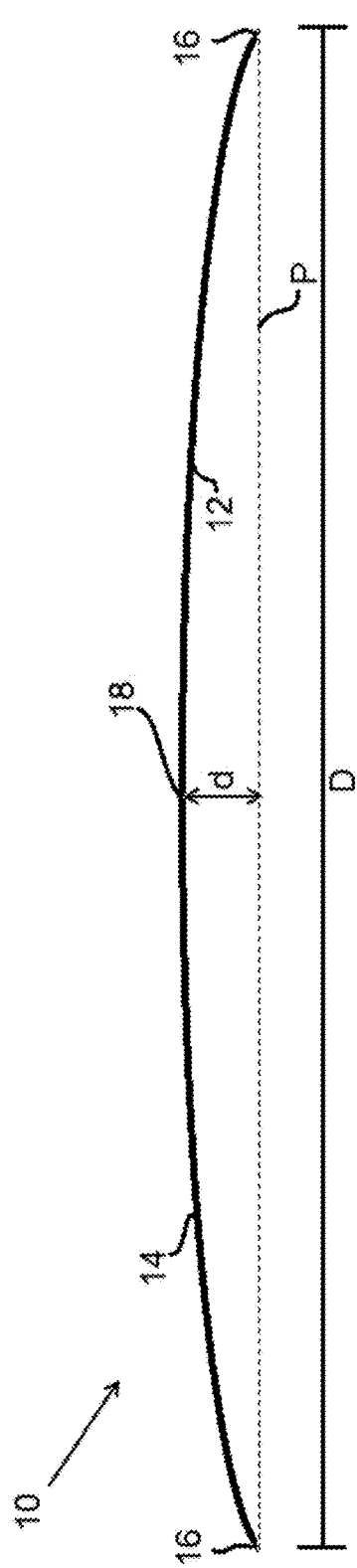
FIG. 1A is a schematic representation of a convex cooking surface of a cooking utensil.

Aspects and implementations disclosed herein are not limited to the details of construction and the arrangement of components set forth in the following description or illustrated in the drawings. Aspects and implementations disclosed herein are capable of being practiced or of being carried out in various ways.

Aspects and implementations disclosed herein are generally directed to cookware and, in some examples, more specifically to cookware for use with induction cooktops. Examples of the cookware disclosed herein exhibit a substantially flat cooking surface at a desired cooking temperature. In some implementations, the cookware has a cooking surface that is concave at room temperature, but becomes less concave with increasing temperature and becomes substantially flat at a desired cooking temperature. The cooking surface of the cookware does not become convex at the cooking temperature or as it is heated to the cooking temperature. As the term is used herein a "cooking surface" or "cook surface" is the surface of an item of cookware or a surface of a cooking utensil upon which food material is placed for cooking.

Most conventional cooking utensils, for example, skillets or pans, have a lower wall and cooking surface that is convex and that remains convex or becomes more convex when heated. FIG. 1A depicts a convex cooking surface 10. The cooking surface 10 of FIG. 1A is represented as a curved line. Features such as a handle, outer wall, other layers of a lower wall which includes the cooking surface, and other features which may be included in a cooking utensil having the cooking surface 10 are omitted from FIG. 1A for clarity. The location of the cooking surface in a cooking utensil is illustrated by the location of cooking layer 116 of the item of induction cookware 100 illustrated in FIG. 2 and by the location of the cooking layer 216 of the item of induction cookware 200 illustrated in FIG. 3. The location of a cooktop including an inductive heating element (not shown) relative to an item of inductive cookware when in use is illustrated by the location of cooktop 290 in FIG. 3.

The convex cooking surface 10 has a bottom surface 12, an upper surface 14, edges 16, and a center portion 18. In the convex cooking surface 10, the edges 16 are lower than the center portion 18.

Figure 1B:
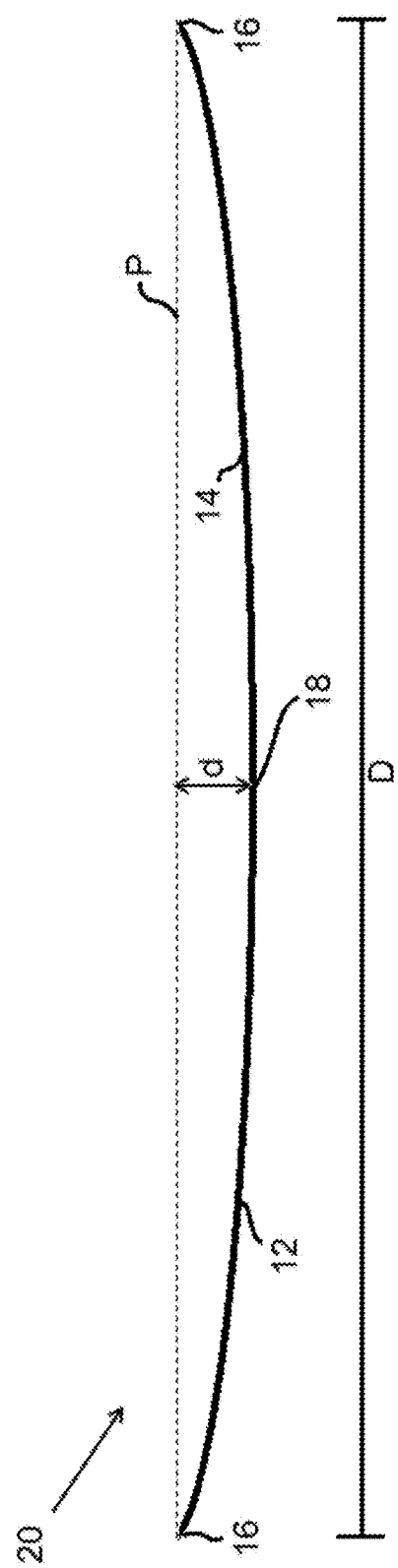
FIG. 1B is a schematic representation of a concave cooking surface of a cooking utensil.

A concave cooking surface 20 is illustrated in FIG. 1B. The concave cooking surface 20 also includes a bottom surface 12, an upper surface 14, edges 16, and a center portion 18. In contrast to the convex cooking surface 10 of FIG. 1A, in the concave cooking surface 20, the edges 16 are higher than the center portion 18. In some examples, cooking surfaces may have concave surfaces which are substantially parabolic or substantially circular in curvature.

As used herein, the directional terms "upward" and "positively displaced" and their synonyms and alternate forms refer to a direction or displacement in a direction from the bottom surface 12 toward the upper surface 14 in a direction away from a cooktop upon which an item of inductive cookware is placed during use. Also, as used herein, the directional terms "downward" and "negatively displaced" and their synonyms and alternate forms refer to a direction or displacement in a direction from the upper surface 14 toward the lower surface 12 in a direction toward a cooktop upon which an item of inductive cookware is placed during use.

The upper surface 14 of a cooking surface as illustrated in FIG. 1A or FIG. 1B is the surface upon which food is placed for cooking. The center portion 18 of the cooking surface is displaced in a height dimension from a plane P defined by the edges of the cooking surface by a distance d. As used herein, a height dimension is defined as perpendicular to the plane P. A degree of convexity (or concavity) may be expressed as a ratio between the distance d and a diameter D of the cooking surface or a radius of the cooking surface. For non-circular cooking surfaces, the diameter D may be considered the diameter of a circle which most closely approximates the perimeter of the non-circular cooking surface. A degree of flatness for a cooking surface may be defined as (1−|d/D|), where |d/D| is the absolute value of the ratio d/D.

In a cooking utensil with a convex lower wall, and/or cooking surface, edge portions, rather than the center portion, of the cooking utensil contact a cooktop on which the cooking utensil is placed, rendering the cooking utensil less prone to wobbling on the cooktop. A problem with cooking utensils having convex lower walls and/or cooking surfaces is that cooking oil, batter, or other liquid or semi-liquid material may pool at the outer edges of the cooking surface while cooking, resulting in poor cooking uniformity. Some other conventional cooking utensils have lower walls and/or cooking surfaces that may be substantially flat at cool temperatures, for example, at room temperature, but deform to exhibit convex lower walls and/or cooking surfaces when heated to a temperature suitable for cooking.

Implementations and examples of cooking utensils disclosed herein include lower walls and/or cooking surfaces that are concave at a low temperature, for example, room temperature (about 68° F. (20° C.)), and which flatten to form a substantially flat cooking surface at a desired cooking temperature, for example, about 440° F. (227° C.). In some examples, a "substantially flat" cooking surface includes a planar or substantially planar cooking surface or a cooking surface having a degree of flatness of at least about 99.5%, for example, a degree of flatness of greater than about 99.6%, greater than about 99.7%, greater than about 99.8%, or greater than about 99.9%. Some implementations and examples disclosed herein include cooking utensils configured for use with an induction cooktop and are referred to herein as induction cookware or induction cooking utensils. Induction cookware may include an outer lower wall that is spaced from an inner wall having an upper cooking surface. Induction cookware having a concave cooking surface may not suffer from instability or wobbling on a cooktop because the cooking surface is separated from the outer lower wall, which may be provided with a substantially flat or convex bottom surface and which may not deform to become concave at a desired cooking temperature.

Figure 2:
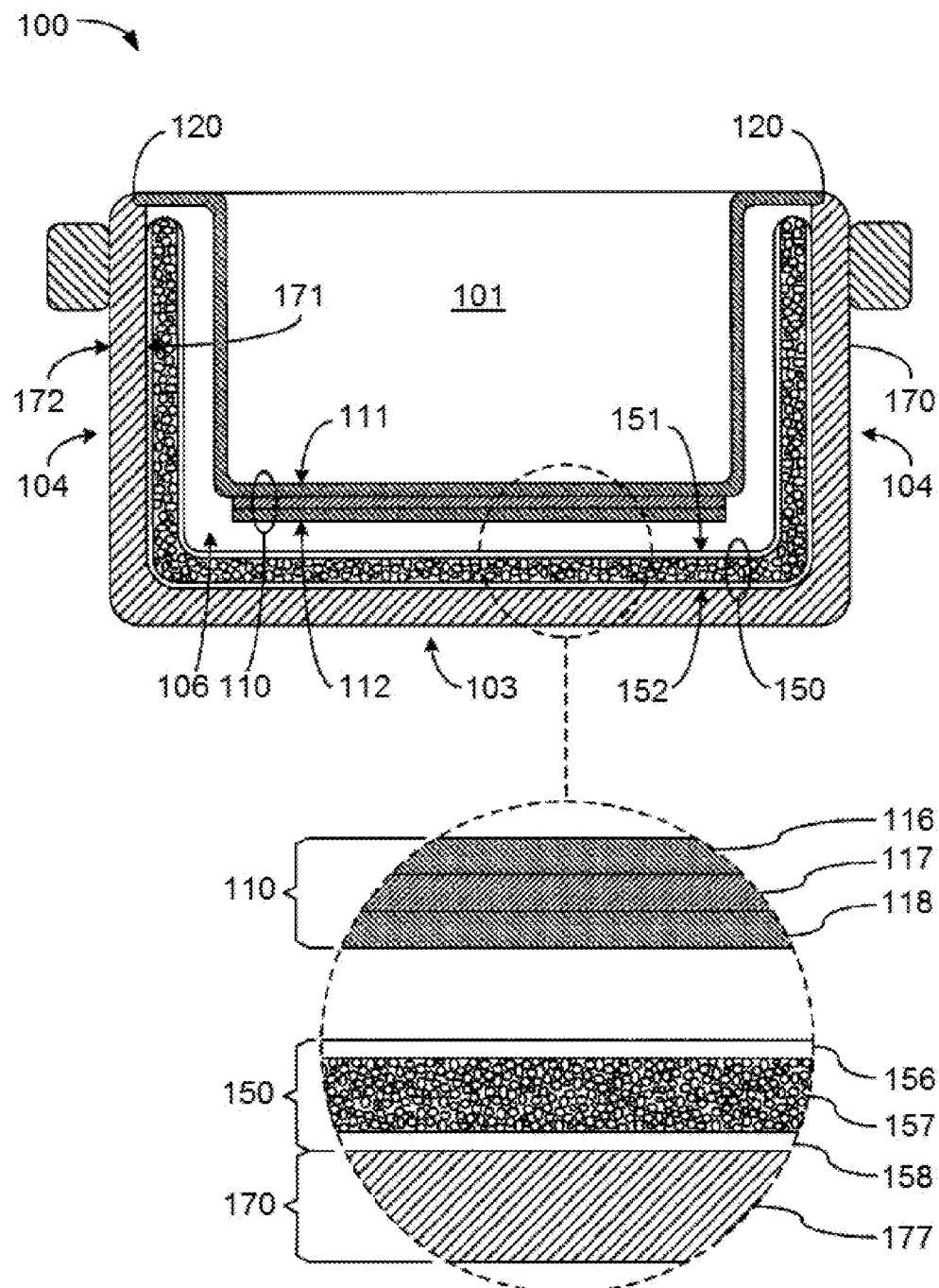
FIG. 2 is a cross sectional illustration of an example of an induction cooking utensil.

Examples of inductive cookware are disclosed in U.S. Patent Application Publication No. 2009/0065496 and U.S. Pat. No. 8,796,598, the disclosures of which are incorporated herein by reference. In one example, as illustrated in FIG. 2, an item of induction cookware 100 incorporates an inner wall 110, a thermal insulator 150 and an outer wall 170 with the inner wall 110 nested within the thermal insulator 150 and the thermal insulator 150 nested within the outer wall 170. In some examples, the thermal insulator 150 is vacuum-sealed but need not be so in all examples. The inner wall 110 is joined at a continuous annular joint 120 to the outer wall 170, thereby defining and fully enclosing a gap 106 between the inner wall 110 and the outer wall 170 within which the thermal insulator 150 is disposed. The thermal insulator 150 of the cooking utensil 100 may incorporate a thermally resistant material 157 enclosed within a pair of sheets 156 and 158, although in some examples, the pair of sheets 156 and 158 may be omitted. Also, different portions of the inner wall 110 incorporate either one or multiple layers, as described below.

The inner wall 110 has an inner surface 111 defining a cooking chamber 101 and an outer surface 112 facing the thermal insulator 150 and the outer wall 170 beyond the thermal insulator 150. Within side wall portions 104 of the cooking utensil 100, the inner wall 110 incorporates a cooking layer 116 forming the cooking surface of the cooking utensil 100, and within the bottom portion 103, the inner wall 110 additionally incorporates a heat spreader layer 117 and a target layer 118.

The cooking layer 116 may be formed from a material having a high corrosion resistance. The cooking layer 116 may be a magnetic or a non-magnetic material. In some example, the cooking layer includes or consists of 316 stainless steel and/or 305 stainless steel. In some implementations, a non-stick coating may be provided on the top of the cooking layer 116.

The target layer 118 may include a material that exhibits a high degree of inductive coupling to electromagnetic energy produced by an induction cooktop that the cooking utensil 100 may be used with to provide for efficient energy transfer from the cooktop to the cooking utensil 100. The target layer 118 may include or consist of a ferromagnetic material. The target layer 118 may include or consist of 410 stainless steel.

The heat spreader layer 117 may include or consist of a material that exhibits a high thermal conductivity, for example, copper or aluminum. The heat spreader layer 117 may extend across substantially the entirety of the lower surface of the inner wall 110, only a portion of the lower surface of the inner wall 110, and/or at least partially up the sides of the inner wall 110. The lower surface of the inner wall 110 is the surface illustrated in FIG. 2 which is covered by the target layer 118 and the heat spreader layer 117 between the portions of the inner wall 110 that curve into the upwardly projecting side portions of the inner wall 110.

The outer wall 170 is designed to stay relatively cool even while the inner wall 110 is heated to high temperatures for extended periods of time. For example, an induction cooktop may heat the target material to between about 425° F. to about 525° F. (about 233° C. to about 275° C.) while the outer surface of the outer wall 170 is maintained at about 140° F. (about 60° C.). In some implementations an inductive cooktop and cookware system may limit the temperature of the inner wall 110 and/or the cooking layer 116 of the inductive cookware to about 440° F. (about 227° C.) because this temperature is sufficient for frying, and few cooking operations would require higher temperatures.

The outer wall 170 has an inner surface 171 facing the thermal insulator 150 and the inner wall 110 beyond the thermal insulator 150, and an outer surface 172 defining much of the exterior of the cooking utensil 100. The outer wall 170 incorporates a non-conductive layer 177 that defines substantially all of the inner surface 171 and the outer surface 172. Despite this depiction of a single-layer outer wall 170, other implementations may additionally incorporate a reflective layer disposed on the inner surface 171 and/or in the gap 106 that reflects infrared energy and heat passing from the inner wall 110 to the outer wall 170 back to the inner wall 110.

Portions of the inner wall 110 and the outer wall 170 meet at the joint 120, and the joint 120 cooperates with these portions of the inner wall 110 and the outer wall 170 to form a gas-tight seal that separates the environment within the gap 106 from the environment external to the gap 106. In some implementations, a getter material may be included in the gap 106 to absorb air that enters the gap 106.

The thermal insulator 150 has an inner surface 151 facing the outer surface 112 of the inner wall 110, and an outer surface 152 facing the inner surface 171 of the outer wall 170. The sheet 156 defines substantially all of the inner surface 151, and the sheet 158 defines substantially all of the outer surface 152. Depending on the ability of the material or materials from which the sheet 156 is made to withstand heat, the thermal insulator 150 may be disposed within the gap 106 with the inner surface 151 spaced away from the outer surface 112 of the inner wall 110 to avoid damage from direct contact with the inner wall 110 at times when the inner wall 110 is heated. In some implementations, this spaced apart position of the thermal insulator 150 from the inner wall 110 is accomplished by adhering or otherwise affixing the thermal insulator 150 to the inner surface 171 of the outer wall 170. One or both of the sheets 156 and 158 may be formed of a metalized polymer, a film of any of a variety of types incorporating silicon dioxide, or other appropriate material having some degree of resistance to damage by exposure to heat and some degree of impermeability to gas molecules. The thermally resistant material 157 may be any of a variety of insulating materials including, and not limited to, a carbon aerogel or a silica aerogel incorporating carbon.

Although not illustrated, the cooking utensil 100 may further include a lid which may be conductive or non-conductive and may include an insulating material and/or a reflective surface. The cooking utensil 100 may have a different form factor than that illustrated. For example, the cooking utensil 100 may be formed as a pan, a skillet, or any other form of cookware useable on an induction cooktop. Other implementations of the cooking utensil 100 are described in U.S. Patent Application Publication No. 2009/0065496 and U.S. Pat. No. 8,796,598. The examples disclosed herein may be applicable to any one or more of the implementations disclosed herein and/or in either of U.S. Patent Application Publication No. 2009/0065496 and U.S. Pat. No. 8,796,598.

Figure 3:
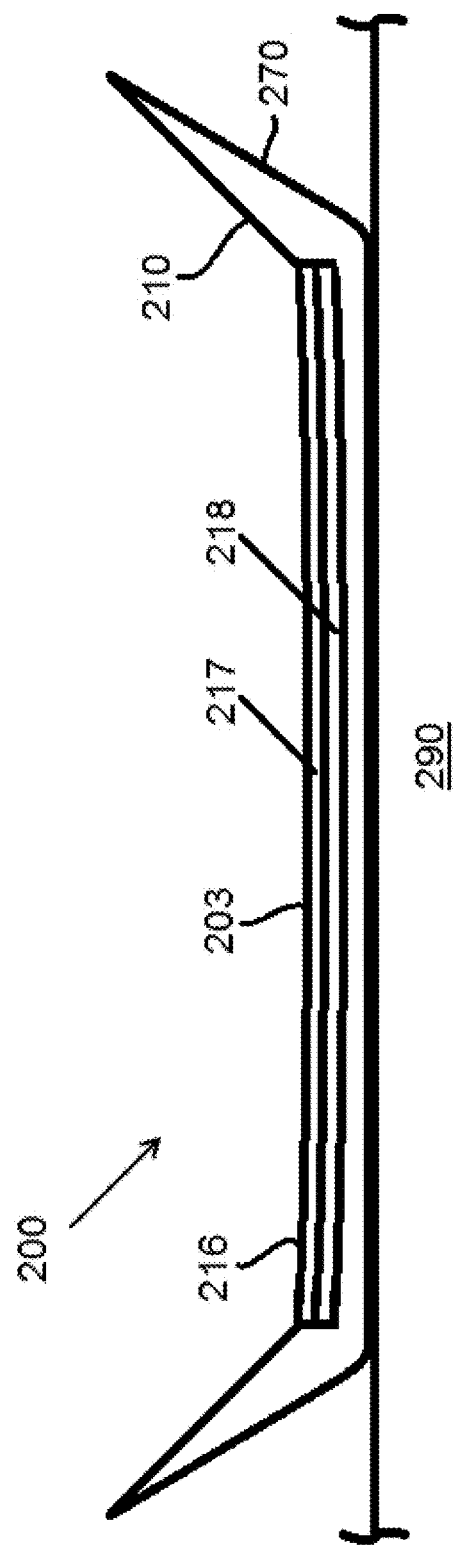
FIG. 3 is a schematic cross sectional illustration of another example of an induction cooking utensil.

A schematic illustration of an item of inductive cookware 200 is illustrated in FIG. 3. The item of inductive cookware 200 includes an outer wall 270 and an inner wall 210. The inner wall 210 includes a cooking layer 216 on its upper surface and a bottom portion 203 having the cooking layer 216 as well as a heat spreader layer 217 and a target layer 218. The cooking layer 216, heat spreader layer 217 and target layer 218 are illustrated as concave, as these layers would be at room temperature in some examples. Additional optional features, for example, handles, insulating layers, and heat reflecting layers are omitted from FIG. 3 for simplicity. In some examples, the item of inductive cookware includes an inner wall 210 that is formed of materials having compositions and dimensions which cause the cooking surface of the inner wall 210 and/or the lower portion 203 of the inner wall 210 as a whole to become substantially flat at a cooking temperature, for example, at a temperature between about 425° F. and about 525° F. (about 218° C. to about 274° C.). The cooking layer 216 of the item of inductive cookware and/or the lower portion 203 of the inner wall 210 as a whole may be concave, convex, or substantially flat at room temperature. When concave or convex at room temperature, the degree of flatness of the cooking layer 216 and/or the lower portion of the inner wall as a whole may increase as the temperature of the cooking layer 216 and/or inner wall 210 is raised and approaches the cooking temperature. In some implementations an item of inductive cookware includes a cooking layer 216 and/or inner wall 210 that is concave at room temperature, becomes flat or substantially flat at a cooking temperature of, for example, between about 425° F. and about 525° F. (about 218° C. to about 274° C.) or about 440° F. (about 227° C.), and does not become convex at any temperature between room temperature and the cooking temperature or at the cooking temperature even when maintained at the cooking temperature for an extended period of time, for example, more than 5 minutes, more than 15 minutes, or more than 30 minutes.

In one example, the inner wall 210 of an item of inductive cookware may include a lower target layer 218 including or consisting of 410 stainless steel and/or a material having similar thermal properties, for example, coefficient of thermal expansion and/or coefficient of thermal conductivity as 410 stainless steel. The target layer 218 may include or consist of 28 gauge 410 stainless steel or 24 gauge 410 stainless steel.

The inner wall 210 of the item of inductive cookware may include an upper cooking layer 216 including or consisting of 316 stainless steel and/or 305 stainless steel and/or a material having similar thermal properties, for example, coefficient of thermal expansion and/or coefficient of thermal conductivity as 316 or 305 stainless steel. The upper cooking layer 216 may include or consist of 24 gauge stainless steel.

The inner wall 210 of the item of inductive cookware may include a heat spreader layer 217 bonded between a lower side of the cooking layer 216 and an upper side of the target layer 218. The heat spreader layer 217 may include or consist of aluminum or an aluminum alloy and/or a material having similar thermal properties, for example, coefficient of thermal expansion and/or coefficient of thermal conductivity as aluminum or a 6061 or 1060 aluminum alloy. The heat spreader layer may have a thickness of between about three and about five times as one or both of the cooking layer 216 and the target layer 218. The heat spreader layer 217 may include or consist of a layer of aluminum or aluminum alloy that is about 2 millimeters (mm) thick. The heat spreader layer 217 may include or consist of a layer of 6061 aluminum alloy and/or 1060 aluminum alloy. The heat spreader layer 217 may include or consist of a layer of 6061-T6 aluminum alloy.

The lower target layer 218, the heat spreader layer 217, and the upper cooking layer 216 may be bonded to one another by, for example, impact bonding. The cooking layer 216 and/or inner wall 210 may be substantially flat at a temperature between about 425° F. and about 525° F. (about 218° C. to about 274° C.) or about 440° F. (about 227° C.) with a 8 W/m² K convection coefficient on the cooking surface.

In one example, the inner wall 210 of an item of inductive cookware may include a concave lower portion 203 with a diameter of about 8.4 inches (21.3 cm) and a center displaced downwardly by about 0.1 inches (about 0.25 cm) relative to edges of the concave lower portion to form a concave cooking surface with a flatness of (1−(0.25/21.3))= 98.8% at room temperature. In another example, the inner wall 210 of an item of inductive cookware may include a concave lower portion 203 with a diameter of about 8.5 inches (21.5 cm) and a center displaced downwardly by about 0.02 inches (about 0.5 mm) relative to edges of the concave lower portion to form a concave cooking surface with a flatness of (1−(0.05/21.5))=99.8% at room temperature. In each of these examples, the cooking surfaces and/or inner walls 210 may flatten with increased temperature and remain concave or flat, but not convex, at a cooking temperature of, for example, about 440° F. (about 227° C.). In other examples, an item of inductive cookware may include a concave lower wall with a diameter of about 8.4 inches (21.3 cm) and a center displaced downwardly by between about 0.02 inches (about 0.5 mm) and about 0.1 inches (about 0.254 cm) relative to edges of a lower portion of the lower wall at room temperature and/or having a flatness of between about 98.8% and 99.8% and may flatten with increased temperature and remain concave or flat, but not convex, at a cooking temperature of, for example, from about 218° C. to about 274° C. or about 227° C. The center of the lower wall, in some examples, is displaced downward relative to the edges of the lower portion of the lower wall by a maximum of between about 0.5 mm and about 0.254 mm.

EXAMPLES

The following examples illustrate how inner walls and cooking surfaces of cooking utensils formed from different materials deform with temperature. These examples were produced from computer simulations. In each of the following examples, the lower surface of the inner wall modeled had a diameter of 8.4 inches (21.3 cm). In the figures referenced in the following examples, the non-shaded outline of the inner wall indicates the shape of the inner wall at room temperature (68° F. (20° C.)), while the shaded illustrations depict the degree of deformation at a temperature of 440° F. (227° C.). The inner walls were modeled as axially symmetric and so only one side of the inner walls are illustrated. The shading of the shaded illustration of the inner walls depicts the degree of deformation at 440° F. (227° C.).

Example 1: Aluminum Inner Wall

Figure 4:
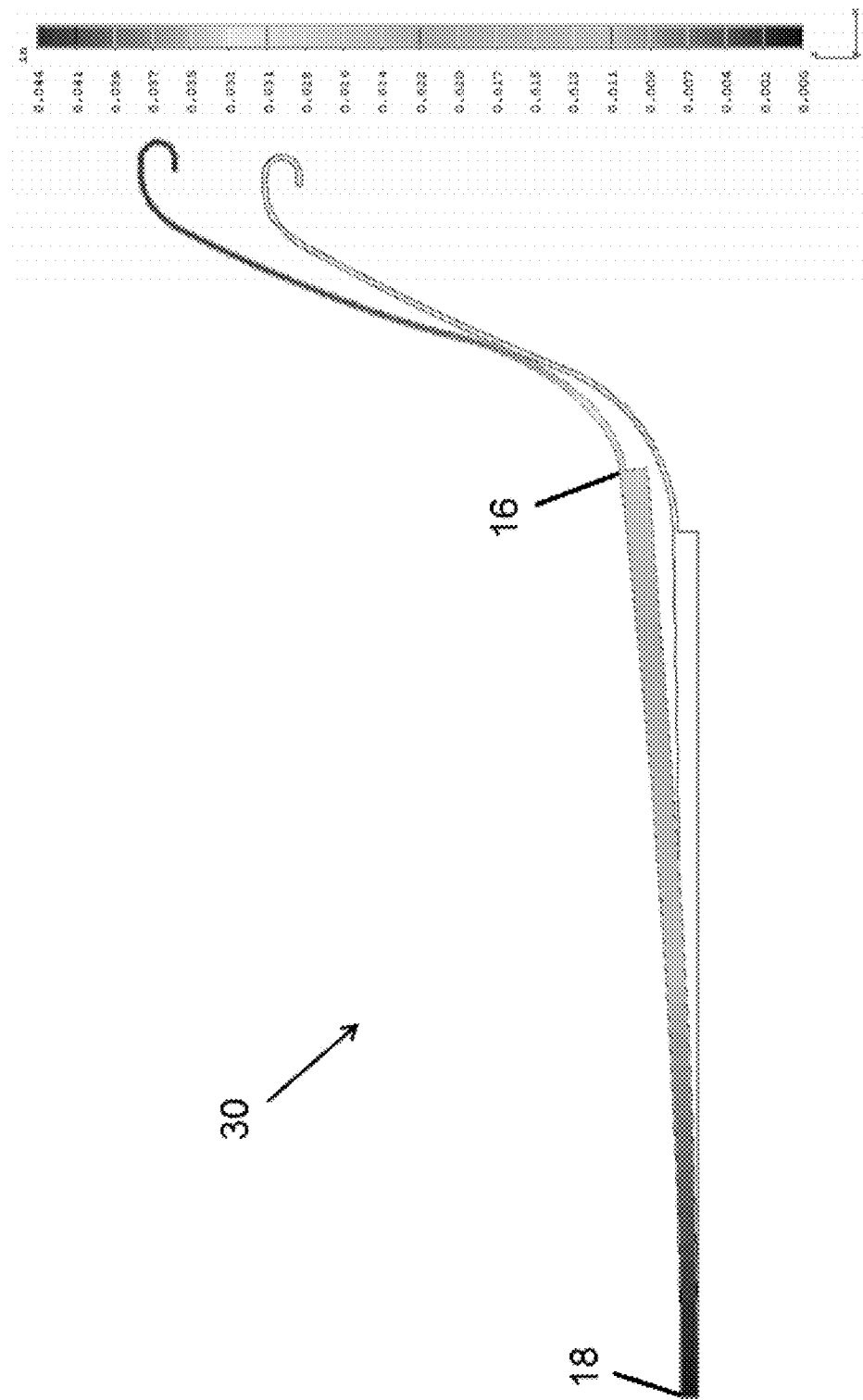
FIG. 4 is an illustration of deformation of an aluminum inner wall of an induction cooking utensil as temperature is changed from room temperature to cooking temperature.

FIG. 4 illustrates the degree of deformation of a solid aluminum inner wall 30 of an induction cooking skillet at 440° F. (227° C.) from its shape at room temperature. At room temperature, the inner wall 30 was concave with the center 18 of the inner wall 30 displaced 0.5 mm below the edges 16. The edges 16 of the inner wall deformed by displacing upwardly by about 0.028 inches (about 0.71 cm) as the inner wall was heated from room temperature to 227° C., increasing the concavity of the cooking surface from a flatness of about (1−0.05/21.3)=99.8% to a flatness of about (1−(0.05+0.71)/21.3)=96.4%. These results were confirmed in actual lab testing. These results show that if an inner wall of solid aluminum were to be used in an inductive cooking skillet, it should be made convex with the edges 16 displaced by about (0.71 cm+0.05 cm)=0.76 cm below the center at room temperature to result in a substantially flat cooking surface at 227° C.

Example 2: Inner Wall with 303 Stainless Steel Cooking Surface

Figure 5:
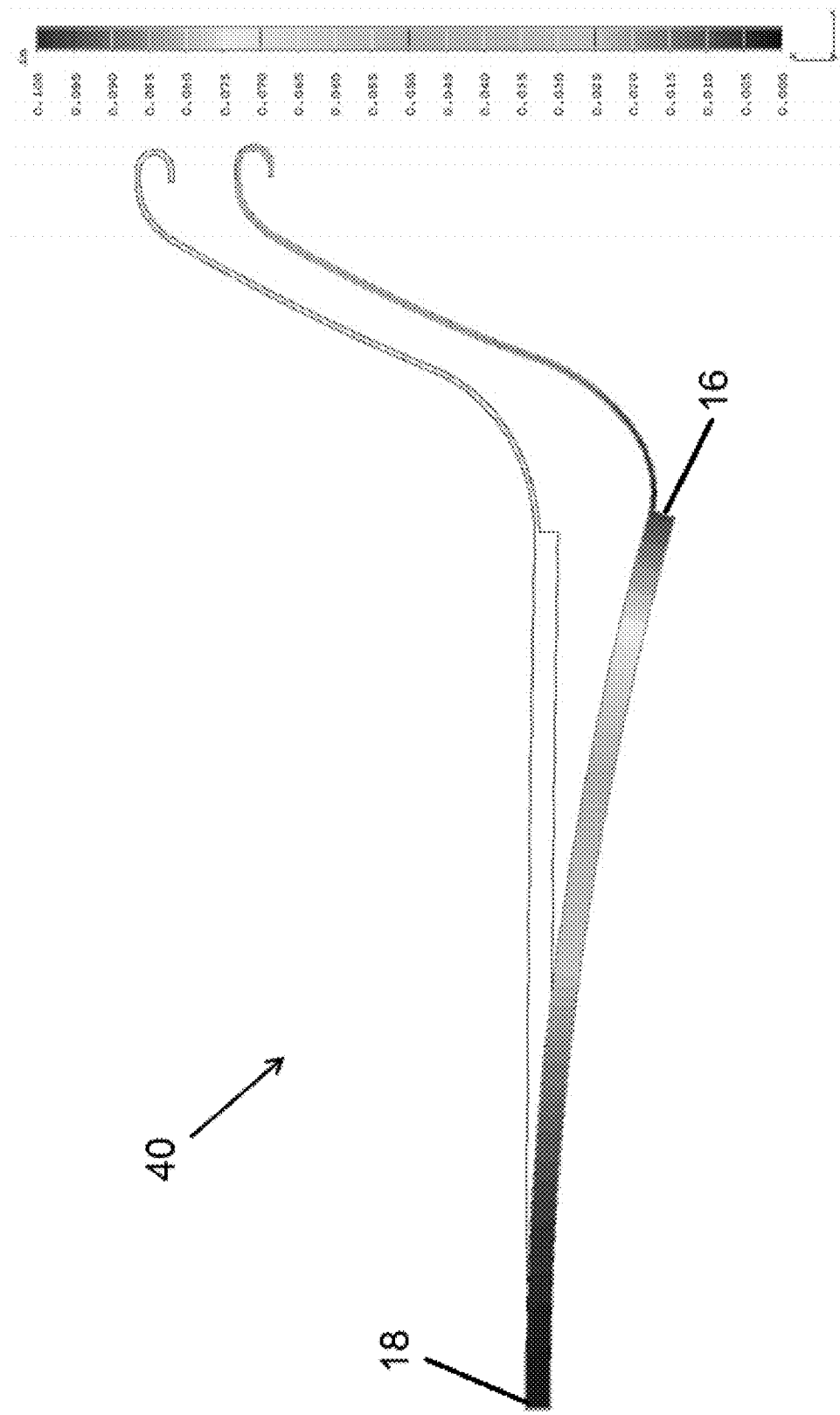
FIG. 5 is an illustration of deformation of an inner wall of an induction cooking utensil having a cooking surface formed of 303 stainless steel as temperature is changed from room temperature to cooking temperature.

FIG. 5 illustrates the degree of deformation of an initially flat inner wall 40 of an induction cooking skillet formed from a 24 gauge target layer of 410 stainless steel, a 2 mm thick aluminum heat spreader layer, and a 24 gauge 303 stainless steel cooking layer at 440° F. (227° C.) from its shape at room temperature. The edges 16 of the inner wall 40 deformed by displacing downward by about 0.1 inches (about 0.25 cm) as the inner wall was heated from room temperature to 227° C., increasing the convexity of the cooking surface from a flatness of 100% to a flatness of about (1−0.25/21.3)=98.8%. These results show that if an inner wall having a 24 gauge target layer of 410 stainless steel, a 2 mm thick aluminum heat spreader layer, and a 24 gauge 303 stainless steel cooking layer were to be used in an inductive cooking skillet, it should be made concave with the edges 16 displaced by about 0.25 cm above the center 18 at room temperature to result in a substantially flat cooking surface at 227° C.

Example 3: Inner Wall with 316 Stainless Steel Cooking Surface

Figure 6:
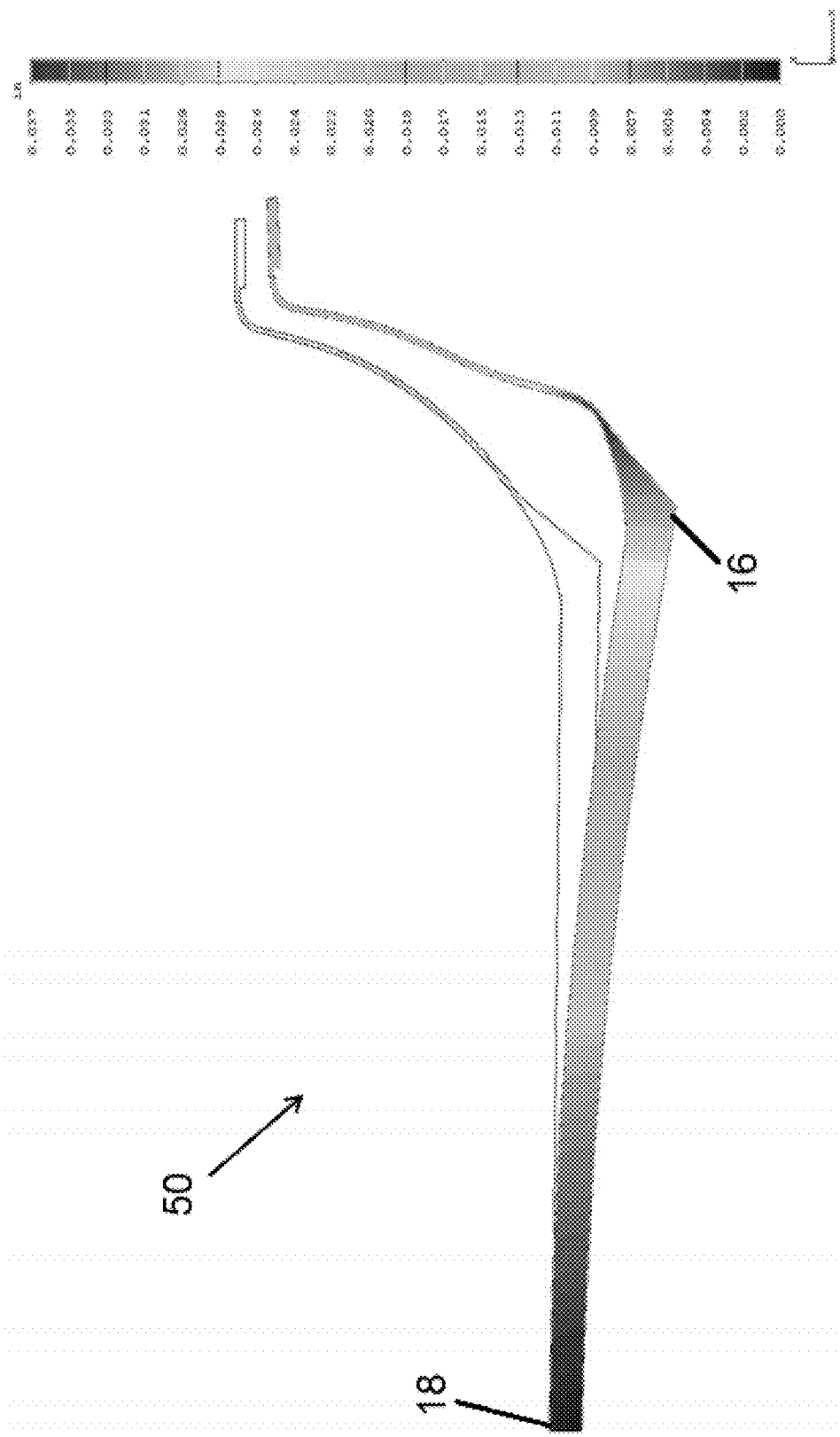
FIG. 6 is an illustration of deformation of an inner wall of an induction cooking utensil having a cooking surface formed of 316 stainless steel as temperature is changed from room temperature to cooking temperature.

FIG. 6 illustrates the degree of deformation of an inner wall 50 of an induction cooking skillet formed from a 24 gauge target layer of 410 stainless steel, a 4 mm thick aluminum heat spreader layer, and a 24 gauge thick 316 stainless steel cooking layer at 440° F. (227° C.) from its shape at room temperature. At room temperature, the inner wall 50 was convex with the center 18 of the inner wall 30 displaced about 0.5 mm above the edges 16. The edge of the bottom portion of the inner wall deformed by displacing downward by about 0.037 inches (about 0.094 cm) as the inner wall was heated from room temperature to 227° C., increasing the convexity of the cooking surface from a flatness of about (1−0.05/21.3)=99.8% to a flatness of about (1−(0.05+0.094)/21.3)=99.3%. These results show that if an inner wall having a 24 gauge target layer of 410 stainless steel, a 4 mm thick aluminum heat spreader layer, and a 24 gauge 316 stainless steel cooking layer were to be used in an inductive cooking skillet, it should be made concave with the edges 16 displaced by about (0.094 cm+0.05 cm)=0.144 cm above the center 18 at room temperature to result in a substantially flat cooking surface at 227° C.

Example 4: Inner Wall with 410 Stainless Steel Cooking Surface

Figure 7:
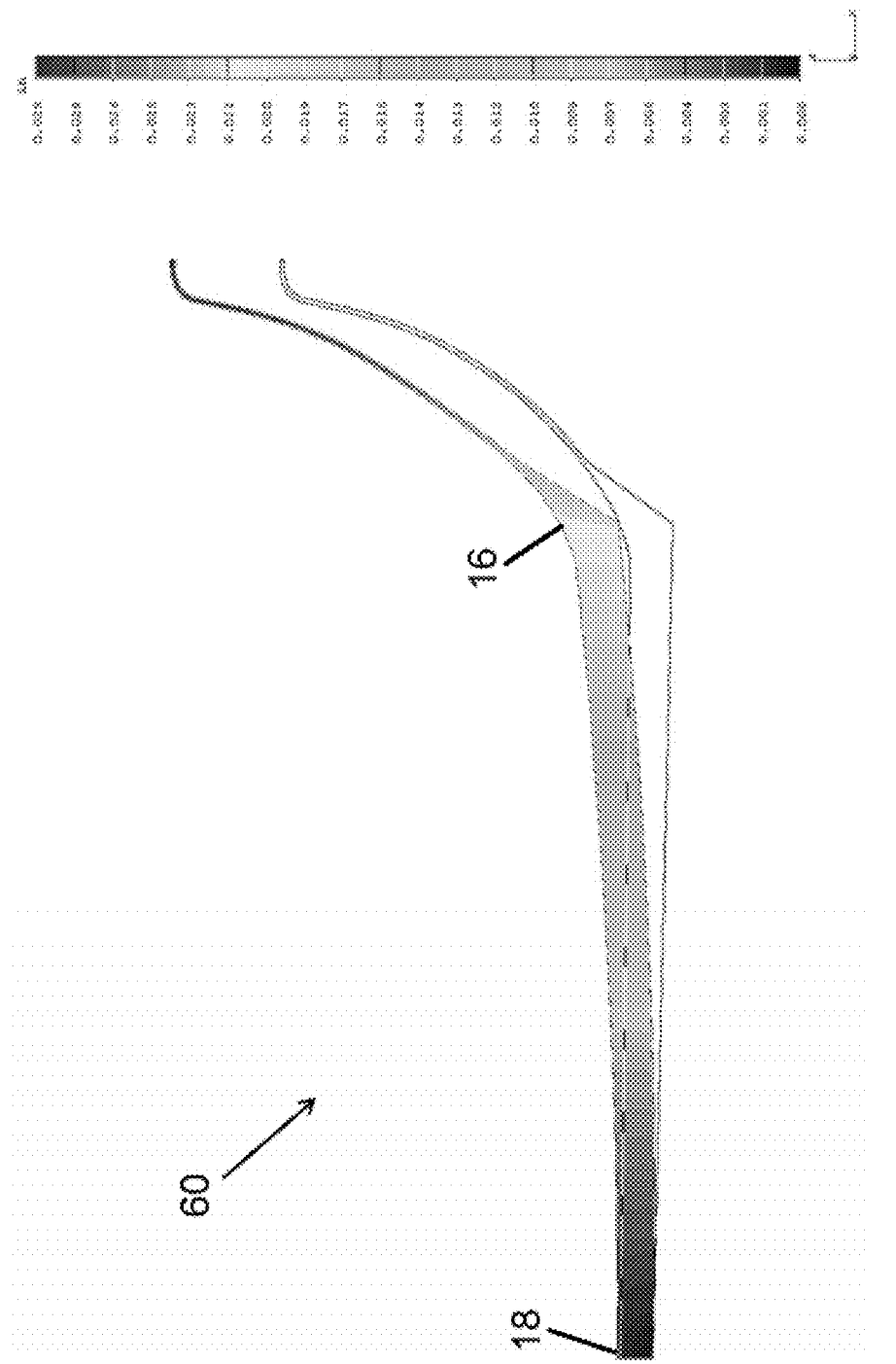
FIG. 7 is an illustration of deformation of an inner wall of an induction cooking utensil having a cooking surface formed of 410 stainless steel as temperature is changed from room temperature to cooking temperature.

FIG. 7 illustrates the degree of deformation of an inner wall 60 of an induction cooking skillet formed from a 24 gauge target layer of 410 stainless steel, a 4 mm thick aluminum heat spreader layer, and a 24 gauge 410 stainless steel cooking layer at 440° F. (227° C.) from its shape at room temperature. At room temperature, the inner wall 60 was convex with the center 18 of the inner wall 30 displaced about 0.5 mm above the edges 16. The edges 16 of the inner wall 60 deformed by displacing upward by about 0.022 inches (about 0.056 cm) as the inner wall was heated from room temperature to 227° C., increasing the concavity of the cooking surface from a flatness of about (1−0.05/21.3)= 99.8% to a flatness of about (1−(0.056−0.05)/21.3)=99.97%. In FIG. 7, the degree of displacement of the edges 16 of the inner wall 60 is highly exaggerated. These results show that if an inner wall having a 24 gauge target layer of 410 stainless steel, a 4 mm thick aluminum heat spreader layer, and a 24 gauge 410 stainless steel cooking layer were to be used in an inductive cooking skillet, it should be made convex with the edges 16 displaced by about (0.056 cm+0.05 cm)=0.061 cm below the center 18 at room temperature to result in a substantially flat cooking surface at 227° C.

Example 5: Inner Wall with 316 Stainless Steel Cooking Surface

Figure 8:
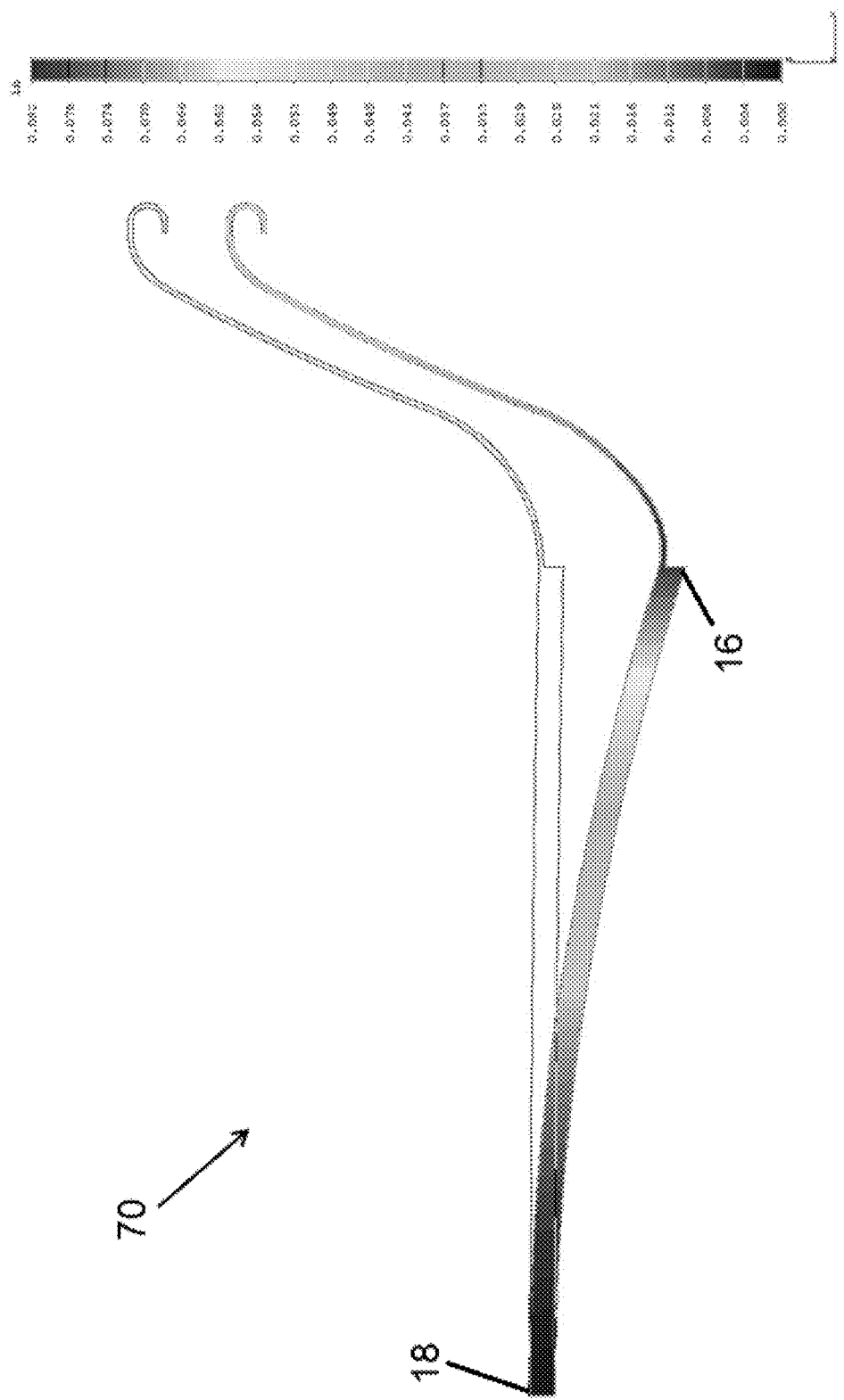
FIG. 8 is an illustration of deformation of an inner wall of another induction cooking utensil having a cooking surface formed of 316 stainless steel as temperature is changed from room temperature to cooking temperature.

FIG. 8 illustrates the degree of deformation of an initially convex inner wall 70 of an induction cooking skillet formed from a 24 gauge target layer of 410 stainless steel, a 2 mm thick aluminum heat spreader layer, and a 24 gauge 316 stainless steel cooking layer at 440° F. (227° C.) from its shape at room temperature. At room temperature, the inner wall 70 was convex with the center 18 of the inner wall 30 displaced about 0.5 mm above the edges 16. The edges 16 of the bottom portion of the inner wall 70 deformed by displacing downward by about 0.81 inches (about 2.06 cm) as the inner wall was heated from room temperature to 227° C., increasing the convexity of the cooking surface from a flatness of about (1−0.05/21.3)=99.8% to a flatness of about (1−(2.06+0.05)/21.3)=90.1%. These results show that if an inner wall having a 24 gauge target layer of 410 stainless steel, a 2 mm thick aluminum heat spreader layer, and a 24 gauge 316 stainless steel cooking layer were to be used in an inductive cooking skillet, it should be made concave with the edges 16 displaced by about (2.06 cm+0.05 cm)=2.11 cm above the center 18 at room temperature to result in a substantially flat cooking surface at 227° C.

Example 6: Inner Wall with 440 Stainless Steel Cooking Surface

Figure 9:
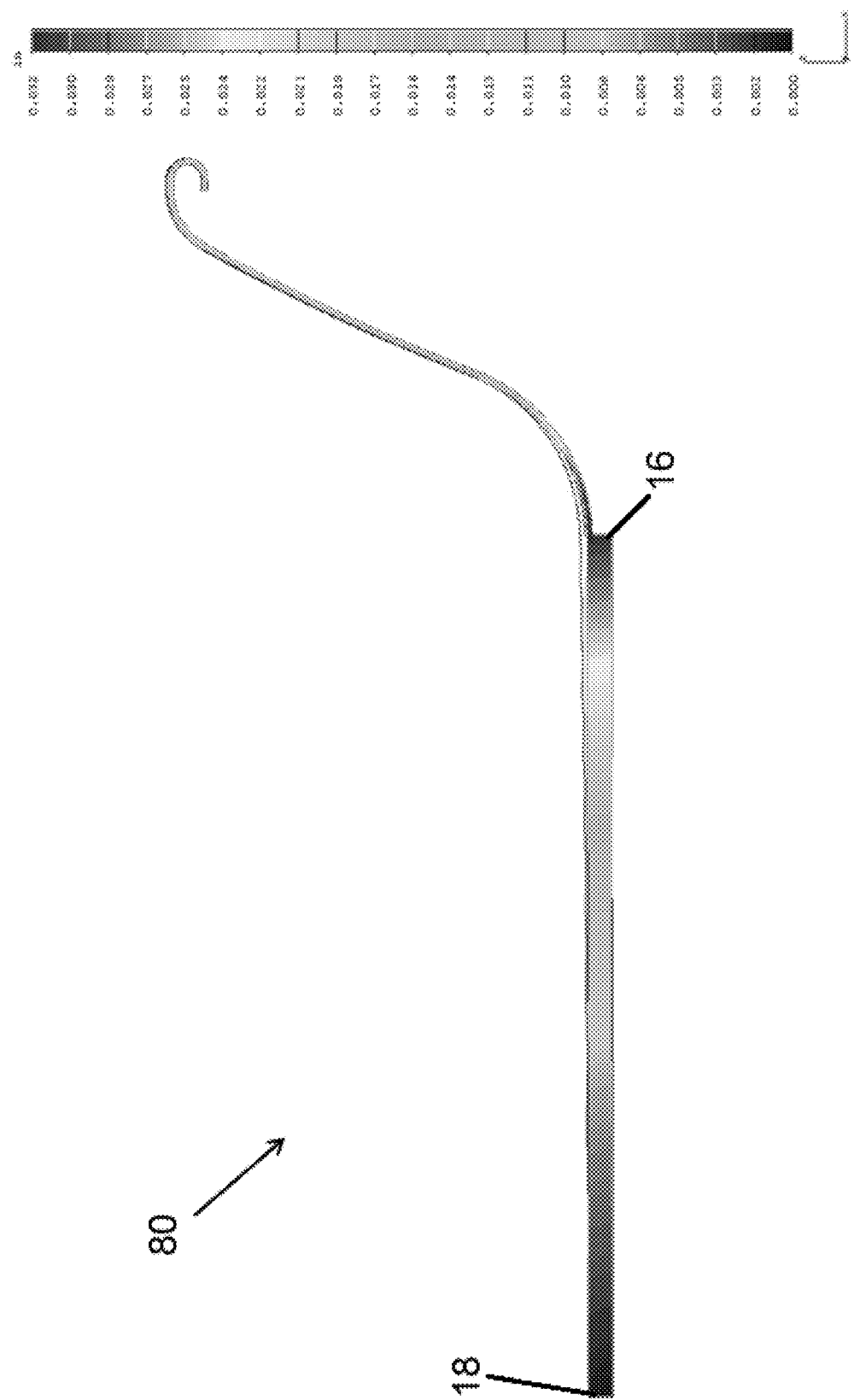
FIG. 9 is an illustration of deformation of an inner wall of another induction cooking utensil having a cooking surface formed of 316 stainless steel as temperature is changed from room temperature to cooking temperature.

FIG. 9 illustrates the degree of deformation of an initially concave inner wall 80 of an induction cooking skillet in accordance with an implementation of the present disclosure formed from a 28 gauge (0.38 mm) thick target layer of 410 stainless steel, a 2 mm thick aluminum heat spreader layer, and a 24 gauge (0.61 mm) thick 316 stainless steel cooking layer at 440° F. (227° C.) from its shape at room temperature. At room temperature, the inner wall 80 was concave with the center 18 of the inner wall 80 displaced about 0.5 mm below the edges 16. The edge 16 of the bottom portion of the inner wall 80 deformed by displacing downward by about 0.027 inches (about 0.069 cm) as the inner wall was heated from room temperature to 227° C., increasing the flatness of the cooking surface from a flatness of about (1−0.05/21.3)=99.8% to a flatness of about (1−(0.069−0.05)/21.3)=99.9%. Modeling showed that a similar skillet with a 24 gauge thick target layer of 410 stainless steel performed equivalently as the skillet shown in this example. These results show that if an inner wall having a 28 gauge target layer of 410 stainless steel, a 2 mm thick aluminum heat spreader layer, and a 24 gauge 316 stainless steel cooking layer were to be used in an inductive cooking skillet, with the edges 16 displaced by about 0.05 cm above the center 18 at room temperature, the inner wall would exhibit a substantially flat cooking surface at 227° C.

The above examples illustrate that the degree of flatness of an inner wall of an item of inductive cookware may change with temperature as the inner wall is heated from room temperature to a cooking temperature. The choice of materials and the dimensions, for example, layer thicknesses, of the materials of the inner walls influences the degree to which the inner wall deforms with temperature as the inner wall is heated from room temperature to a cooking temperature. An example in accordance with the present disclosure exhibits a concave cooking surface at room temperature that is significantly flat at a cooking temperature of 227° C.

The above examples also suggest a method of designing an inner wall for inductive cookware that is substantially flat at a desired cooking temperature. A computer model or actual model of an inner wall having a desired diameter or perimeter and a desired stack of a target layer, heat spreader layer, and cooking layer of desired materials and thicknesses is created. An initial degree of concavity or convexity may be applied to the model at room temperature. The model is heated or a computer simulation of heating the computer model is performed and the deflection of the edges of the model of the inner wall is measured or calculated. The model is then adjusted to modify the room temperature shape of the inner wall to compensate for the observed or calculated deflection of the edges such that the inner wall will achieve a substantially flat cooking surface at the desired cooing temperature.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An inductive cooking utensil including a target layer comprising ferromagnetic stainless steel, a heat spreader layer comprising an aluminum alloy bonded to the target layer, and a cooking layer comprising stainless steel bonded to the heat spreader layer, wherein the cooking layer has a concave cooking surface at room temperature that flattens to have a degree of flatness of at least 99.5% at a cooking temperature.

2. The inductive cooking utensil of claim 1, wherein the cooking surface is not convex at the cooking temperature.

3. The inductive cooking utensil of claim 2, wherein the cooking temperature is between about 218° C. and about 274° C.

4. The inductive cooking utensil of claim 1, wherein the target layer consists essentially of 410 stainless steel.

5. The inductive cooking utensil of claim 4, wherein the target layer consists essentially of 28 gauge 410 stainless steel.

6. The inductive cooking utensil of claim 4, wherein the target layer consists essentially of 24 gauge 410 stainless steel.

7. The inductive cooking utensil of claim 1, wherein the heat spreader layer consists essentially of one of 1060 aluminum and 6061 aluminum.

8. The inductive cooking utensil of claim 7, wherein the heat spreader layer consists essentially of a 2 mm thick layer of one of 1060 aluminum and 6061 aluminum.

9. The inductive cooking utensil of claim 1, wherein the cooking layer consists essentially of 316 stainless steel.

10. The inductive cooking utensil of claim 1, wherein the cooking layer consists essentially of 305 stainless steel.

11. The inductive cooking utensil of claim 1, wherein the cooking layer consists essentially of one of 24 gauge 316 stainless steel and 24 gauge 305 stainless steel.

12. The inductive cooking utensil of claim 1, wherein at room temperature, the inner wall is concave with a center portion of the inner wall being displaced about 0.5 mm below edges of the inner wall.

13. The inductive cooking utensil of claim 12, having a diameter of about 21 cm.

14. The inductive cooking utensil of claim 1, wherein the cooking layer, the heat spreader layer, and the target layer define a lower portion of an inner wall of the inductive cooking utensil, and the inductive cooking utensil further comprises a non-conductive outer wall and a gap defined between the lower portion of the inner wall and the outer wall.

15. An inductive cooking utensil comprising:
an outer wall;
an inner wall disposed within and coupled to the outer wall, the inner wall having a concave cooking surface at room temperature that flattens to have a degree of flatness of at least 99.5% at a cooking temperature of between about 218° C. and about 274° C.; and
a gap defined between a portion of the inner wall and the outer wall.

16. The inductive cooking utensil of claim 15, wherein the cooking surface is not convex at the cooking temperature.

17. The inductive cooking utensil of claim 16, wherein the inner wall includes a target layer comprising one of 24 gauge 410 stainless steel and 28 gauge 410 stainless steel, a heat spreader layer comprising a 2 mm thick layer of one of 1060 aluminum and 6061 aluminum bonded to the target layer, and a cooking layer comprising one of 24 gauge 316 stainless steel and 24 gauge 305 stainless steel bonded to the heat spreader layer.

18. The inductive cooking utensil of claim 17, wherein at room temperature, the inner wall is concave with a center portion of the inner wall being displaced about 0.5 mm below edges of the inner wall.

19. A method of forming an inner wall for an inductive cooking utensil, the method comprising:
bonding a cooking layer consisting essentially of one of 24 gauge 316 stainless steel and 24 gauge 305 stainless steel to an upper surface of a heat spreader layer consisting essentially of a 2 mm thick layer of one of 1060 aluminum and 6061 aluminum; and
bonding a target layer consisting essentially of one of 24 gauge 410 stainless steel and 28 gauge 410 stainless steel to a lower surface of the heat spreader layer.

20. The method of claim 19, wherein bonding the cooking layer to the heat spreader layer includes impact bonding the cooking layer to the heat spreader layer.

21. The method of claim 20, wherein bonding the target layer to the heat spreader layer includes impact bonding the target layer to the heat spreader layer.

22. The method of claim 20, wherein forming the inner wall includes forming the inner wall with a center portion of the inner wall being displaced about 0.5 mm below edges of the inner wall at room temperature.

23. The inductive cooking utensil of claim 1, wherein the cooking surface has a degree of flatness of greater than 99.7% at the cooking temperature.

24. The inductive cooking utensil of claim 1, wherein the cooking surface has a degree of flatness of greater than 99.9% at the cooking temperature.

25. The inductive cooking utensil of claim 3, wherein the cooking temperature is 227° C.

26. The inductive cooking utensil of claim 15, wherein the cooking surface has a degree of flatness of greater than 99.7% at the cooking temperature.

27. The inductive cooking utensil of claim 15, wherein the cooking surface has a degree of flatness of greater than 99.9% at the cooking temperature.

28. The inductive cooking utensil of claim 15, wherein the cooking temperature is 227° C.

* * * * *